Patented Sept. 12, 1950

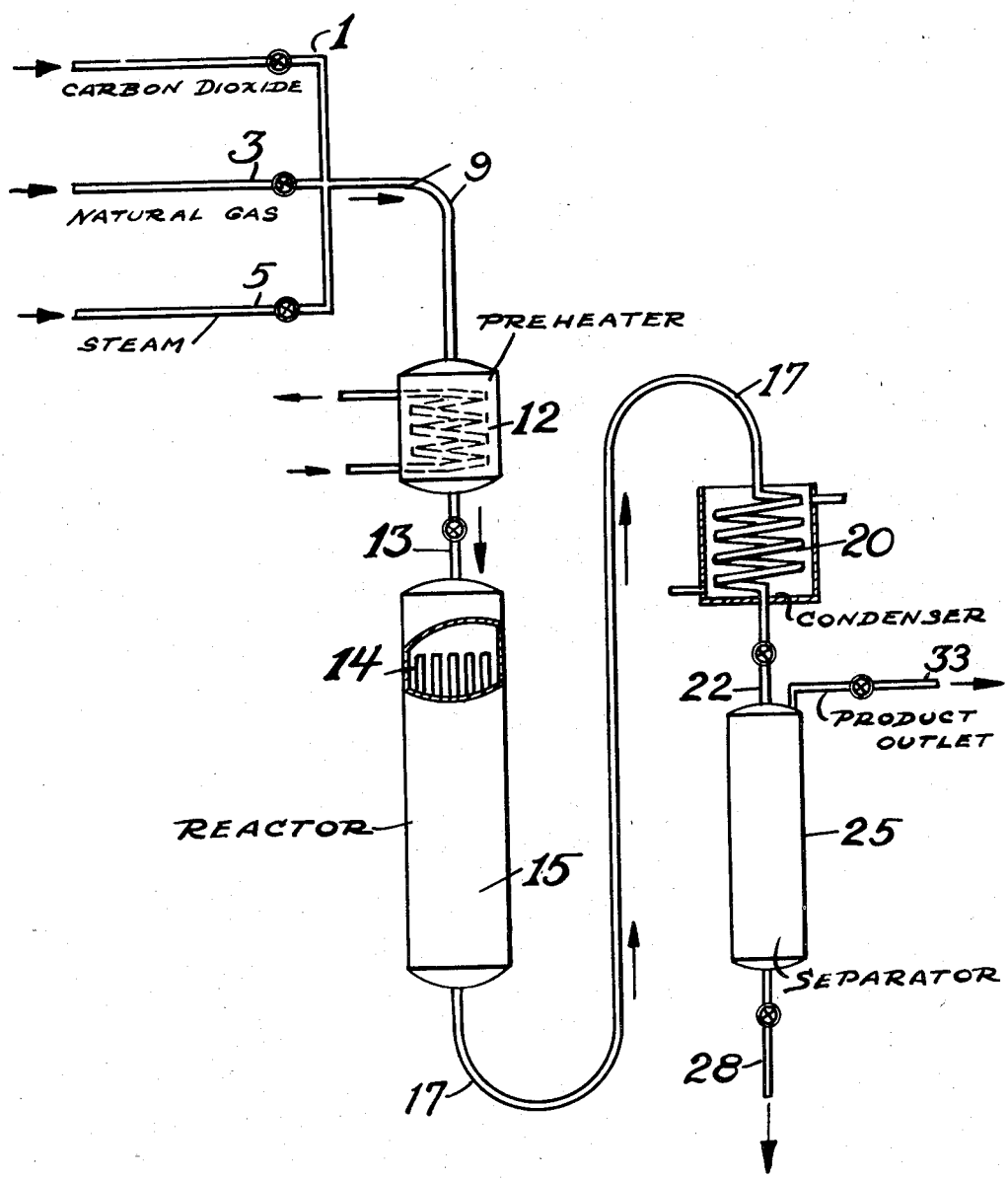

2,522,468

UNITED STATES PATENT OFFICE 2,522,468

PRODUCTION OF SYNTHESIS GAS

Warren M. Smith, Baton Rouge, La., assignor to Standard Oil Development Company, a corporation of Delaware Application December 28, 1945, Serial No. 637,614

3 Claims. (Cl. 252—373)

My invention relates to the production of a mixture of carbon monoxide and hydrogen, and more particularly to a mixture of carbon monoxide and hydrogen suitably proportioned for use as feed-gas in the synthesis of hydrocarbons.

It is a matter of record and commercial practice, particularly in countries foreign to the United States, to prepare hydrocarbons, including those boiling in the gasoline and gas oil range, by reacting together at elevated temperatures a mixture of carbon monoxide and hydrogen. The processes employed are catalytic, and while catalysts of the VIII Group of the Periodic System have been tested, it is fairly well established that the best catalysts for the hydrocarbon synthesis are composed of cobalt or iron.

One of the problems involved in the hydrocarbon synthesis is that of producing economically a synthesis feed-gas, that is to say, a mixture of carbon monoxide and hydrogen suitably proportioned. Ordinarily, in using cobalt catalyst, the art has heretofore deemed it necessary to prepare a feed-gas consisting of about 2 moles of hydrogen per mole of carbon monoxide, the theory being, that the stoichiometry of the process requires sufficient hydrogen (a) to form water with the oxygen of the carbon monoxide molecule, and (b) to unite with the carbon to form the $CH_2$ radical which is considered to be the ultimate unit from which the paraffinic chain is formed, during the synthesis. On the other hand, when using an iron catalyst, the ratio of carbon monoxide to hydrogen in the feed-gas has generally been on the order of 1 mole of carbon monoxide to 1 mole of hydrogen. The former type of reaction with a cobalt catalyst results in the formation of paraffinic hydrocarbons from methane to a normally solid wax, while the latter type of reaction with an iron catalyst results in the formation of unsaturated hydrocarbons. It is with the latter type of process that my present invention possesses utility.

The usual procedure for the preparation of hydrocarbon synthesis feed-gas of 1 to 1 hydrogen to carbon monoxide molar ratio in the past has been based on the reaction of steam with carbon at elevated temperatures. However, I have found that I may satisfactorily prepare a suitable hydrocarbon synthesis feed-gas, containing approximately 1 mole hydrogen per mole of carbon monoxide by "reforming" methane with steam in the presence of carbon dioxide, using a nickel catalyst, at super-atmospheric pressure and temperatures around 1500° F. I am aware that prior to my invention others have formed mixtures of carbon monoxide and hydrogen by reforming methane in the presence of steam, but insofar as I am aware the prior literature and practice have not disclosed nor practiced a process in which the reformation is carried out using a nickel catalyst, super-atmospheric pressure, and a temperature on the order of 1500° F. to produce a 1 to 1 molar mixture of carbon monoxide and hydrogen.

The object of my invention is to provide an economical, feasible and otherwise satisfactory process for producing a mixture of carbon monoxide and hydrogen in proportions not greatly departing from a 1 to 1 ratio.

Another object of my invention is to prepare from a normally gaseous paraffinic hydrocarbon, a mixture of carbon monoxide and hydrogen in equally molar proportions.

Other and further objects of my invention will appear in the following more detailed description and claims.

In the accompanying drawing I have shown the main essentials of an apparatus employed in carrying out my present process.

Referring in detail to the drawing, the same represents the essentials of an apparatus I employed in carrying my invention into effect, it being understood that to measure flow, suitable meters (not shown) and valves to control flow (not shown), together with other conventional accessory apparatus were used but these have been omitted from the drawing in the interest of clarity and because the skilled engineer will understand where they may be disposed in the unit and further may desire to make slight changes of his own. I caused carbon dioxide, natural gas and steam to enter the system shown via lines 1, 3 and 5, respectively. The mixture of natural gas, steam and carbon dioxide was withdrawn and passed via line 9 and forced through preheater 12 and thereafter withdrawn through a reforming furnace 15. The reformer furnace is well known in the art and need not be described or shown in great detail. It will suffice to point out that the furnace contains a plurality of tubes 14 containing a catalyst such as metallic nickel through which the foregoing gaseous mixture is forced. In the space surrounding tubes 14, a fuel is burned (e. g. natural gas, oil refinery gas, etc.) to supply the heat necessary to support the endothermic reaction occurring in the said tubes. The reforming reaction takes place (hereinafter, I have set forth a specific example, giving operating conditions and the yields) and the product is withdrawn via line 17, forced through condenser 20 where the steam is condensed, thence the water and gases pass via line 22 into a separator drum 25 from which the product gases are withdrawn through line 33 while the excess water exits through line 28. The gases in line 33 are treated by conventional means for purification of the synthesis gases by removal and recovery of carbon dioxide in equipment not shown.

In further explaining my invention, at temperatures in the vicinity of 1500° F. and in the presence of a satisfactory catalyst, methane reacts with steam as follows:

$$CH_4 + H_2O \rightarrow CO + 3H_2 \qquad (1)$$

Since the molar ratio of hydrogen to carbon monoxide in the product from this reaction is higher than is desired for hydrocarbon synthesis gas, the ratio is changed by the introduction of carbon dioxide according to the water gas equilibrium reaction:

$$H_2 + CO_2 \rightleftharpoons CO + H_2O \qquad (2)$$

For the production of a mixture of hydrogen and carbon monoxide in equi-molar proportions the overall effect or net effect of Equations 1 and 2 above is:

$$CH_4 + CO_2 \rightarrow 2CO + 2H_2 \qquad (3)$$

It may be desirable under certain circumstances that the volume ratio of carbon monoxide and hydrogen in the product depart somewhat from the exact 1 to 1 ratio, that is to say, it may be desired to have 0.9 to 1.1 moles of hydrogen per mole of carbon monoxide in the product gas. This alteration in the volume ratio of the said product constituents may be effected by varying the amount of $CO_2$ reactant, an increase in the amount of reactant $CO_2$ effecting a decrease in the ratio of hydrogen to carbon monoxide below 1 to 1 in the product, and vice versa.

Actual operation at the mole ratio of reactants as indicated in (3), however, will be found to result in synthesis feed-gas mixtures of less than 1 to 1 molar ratio of hydrogen to carbon monoxide due to reaction of some of the hydrogen produced in the reaction with some of the carbon dioxide. In addition, incomplete conversion of methane will be obtained with only short periods of operation due to the deposition of carbon from partial decomposition of the methane, which in time will cause excessive pressure drop through the catalyst bed in the reactor. It has been found that these adverse effects may be minimized and satisfactory operation attained for suitable periods of time by the addition of excess oxygen in the form of water and carbon dioxide in a suitable proportion to maintain the desired ratio of hydrogen to carbon monoxide in the product.

For a product of any desired mole ratio of hydrogen to carbon monoxide the excess oxygen contained in the feed is defined as the oxygen contained in the feed in the form of steam and carbon dioxide in excess of that required to convert all the methane in the feed to hydrogen and carbon monoxide according to the equation $CH_4 + CO_2 \rightarrow 2CO + 2H_2$. From this definition it follows that the amount of excess oxygen in the feed can be varied without changing the mole ratio of hydrogen to carbon monoxide in the product, the amount of excess oxygen used being at least the amount necessary to prevent carbon deposition on the catalyst. The amount of excess oxygen necessary for satisfactory continuous operation has been found to be in the range of 50 to 100%. The composition of the excess oxygen used is determined thermodynamically by the temperature of operation and by the molar ratio of hydrogen to carbon monoxide desired in the synthesis feed-gas produced. Thus, for the production of a synthesis feed-gas containing a 1 to 1 molar ratio of hydrogen to carbon monoxide at an operating temperature of about 1500° F., the excess oxygen based on Equation 3 will be composed of approximately equal volumes of steam and carbon dioxide. Further, for operating temperatures above 1500° F. the carbon dioxide and steam constituting the excess oxygen will be in a proportion less than one volume of carbon dioxide to one volume of hydrogen and for temperatures below 1500° F. the carbon dioxide and steam constituting the excess oxygen will be in a proportion greater than one volume of carbon dioxide to one volume of steam. For example, at an operating temperature of 1800° F. the excess oxygen must be composed of approximately one volume of carbon dioxide per two volumes of steam whereas at an operating temperature of about 1300° F. the excess oxygen must be composed of approximately two volumes of carbon dioxide per volume of steam.

*Example 1*

During a two month period I treated methane (as natural gas) with steam and carbon dioxide at a temperature of 1500° F. in the presence of a nickel catalyst carried on kaolin at 1.5 atmospheres absolute pressure in a reformer furnace, in which process I fed the methane at a rate of 100 volumes of methane per volume of catalyst per hour (the methane being measured at 60° F. and 1 atmosphere pressure). With the methane I also fed steam and carbon dioxide, the steam to methane proportion in the feed being 0.5 and the carbon dioxide to methane in the feed being 1.5. At these conditions, sufficient oxygen was present in the feed to the reformer furnace to provide a 75 volume % excess over that theoretically required. The gas collected was analyzed with the following results:

Make Gas Analysis:

| | |
|---|---|
| $CO_2$ | 12.0 |
| $CO$ | 42.3 |
| $H_2$ | 42.2 |
| $CH_4$ | 1.6 |
| $N_2$ | 1.9 |
| | 100.0 |

Ratio $H_2/CO = 1.00$

It can be seen from the foregoing product gas analysis that the same contained 1 mole of hydrogen per mole of carbon monoxide. Also no difficulty with pressure drop was had during the two month period of operation.

And as hereinbefore set forth, it is an important feature of my invention from the standpoint of continuous operation and the avoidance of undue carbonaceous deposition on the catalyst in the reaction zone, that an excess of oxygen be included in the feed to the reforming zone, as steam and carbon dioxide, over and above that required to form an equal molar mixture of carbon monoxide and hydrogen in the product gas. I have given herein in the form of equations, the theoretical proportions of steam, carbon dioxide and say methane which will result in the formation of a product, by reformation, containing one mole of carbon monoxide for each mole of hydrogen, or some other ratio thereof. However, in continuous operation it is necessary, in order to repress excessive coking and large pressure drops in the reactor, that the said excess of water and carbon dioxide be included in the feed to the reaction zone. This excess may be from 50–100%, expressed as excess oxygen, over the theoretical as set forth in the said foregoing equations. With regard to pressure, I may operate at pressures from 0 to 50 pounds per square inch gauge. The temperature during reforming may be from 1300–2000° F. but generally, temperatures around 1500° F. have been found by me to give good results over an extended period of operation. Thermodynamically, the temperature used should be as high as possible commensurate with equipment limitations to obtain complete conversion of methane to carbon monoxide and hydrogen and to decrease the ratio of carbon dioxide to steam required as excess oxygen as hereinbefore explained.

Instead of using methane or natural gas as the feed, I may employ other normally gaseous hydrocarbons, such as ethane, or mixtures of ethane and methane, or mixtures containing methane, ethane and propane. Instead of using nickel as a catalyst, iron may be used. It is obvious that in order to produce a gas containing 1 mole of carbon monoxide for each mole of hydrogen the proportions of steam and carbon dioxide will have to be so adjusted as to compensate for the different carbon-hydrogen ratio of the hydrocarbon in order to provide the desired results. In the foregoing specification I have stated that a desired product is one containing substantially equi-molar proportions of hydrogen and carbon monoxide, but it is to be understood as stated previously, that the ratio of hydrogen to carbon monoxide may vary from about 0.9 to 1.1 moles of hydrogen per mole of carbon monoxide in the final product, the quantity of steam and carbon dioxide used being altered to accommodate this range of ingredients in the product in accordance with the explanations and teachings hereinbefore set forth.

Numerous modifications of my invention may be made by those who are familiar with this art without departing from the spirit of the invention.

What I claim is:

1. The method of continuously forming a mixture of carbon monoxide and hydrogen in equimolar proportions which consists essentially in charging a mixture of methane, steam and carbon dioxide to a reforming zone containing a catalyst which is one of the group consisting of nickel and iron on a carrier, maintaining said reforming zone at temperatures within the range of from about 1300° F. to 1800° F., adjusting the proportions of methane, steam and carbon dioxide so that there is from 50–100 per cent excess oxygen over that satisfying the following equation: $CH_4 + CO_2 \rightarrow 2CO + 2H_2$ by adding additional carbon dioxide and steam to supply such excess oxygen such additional carbon dioxide and steam being proportioned in the ratio of from ½ to 2 mols of carbon dioxide per volume of steam for the purpose of preserving the product ratio shown in the above equation, permitting the methane, steam and carbon dioxide to remain resident in the reforming zone for a sufficient period of time to effect the desired conversion and recovering from said zone, a product gas containing about equal volumes of carbon monoxide and hydrogen.

2. The method set forth in claim 1 in which when the temperature in the reforming zone is about 1500° F. that carbon dioxide and steam which constitute the excess oxygen are present in about equi-molar proportions.

3. The continuous method of forming about equal molar parts of hydrogen and carbon monoxide in a product gas which comprises continuously charging a mixture of methane, steam and carbon dioxide to a reforming zone, maintained at a temperature of about 1500° F. containing a catalyst which is one of the group consisting of nickel and iron on a carrier, the said mixture containing about 0.5 volume of steam and about 1.5 volumes of carbon dioxide per each volume of methane, maintaining a reforming temperature in said reforming zone and continuously recovering from said zone a product in which the ratio of hydrogen to carbon monoxide is about 1 to 1.

WARREN M. SMITH.

REFERENCES CITED

The following references are of record in the file of this patent:

UNITED STATES PATENTS

| Number | Name | Date |
|---|---|---|
| 2,198,553 | Roberts | Apr. 23, 1940 |
| 2,199,475 | Wilcox | May 7, 1940 |
| 2,234,941 | Keith | Mar. 11, 1941 |
| 2,256,333 | Wilcox | Sept. 16, 1941 |

OTHER REFERENCES

"Synthetic Petroleum from the Synthine Process," by Weil, Chem. Pub. Co., New York, 1948, p. 29 pertinent.